(12) United States Patent
Kim et al.

(10) Patent No.: US 11,754,073 B2
(45) Date of Patent: Sep. 12, 2023

(54) COMPRESSOR FAULT DIAGNOSTIC APPARATUS AND SYSTEM

(71) Applicant: LG ELECTRONICS INC., Seoul (KR)

(72) Inventors: Sehoon Kim, Seoul (KR); Jangsik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 769 days.

(21) Appl. No.: 16/683,712

(22) Filed: Nov. 14, 2019

(65) Prior Publication Data
US 2020/0224948 A1    Jul. 16, 2020

(30) Foreign Application Priority Data

Jan. 11, 2019 (KR) .................. 10-2019-0004130

(51) Int. Cl.
| | |
|---|---|
| F04C 28/28 | (2006.01) |
| F25B 49/02 | (2006.01) |
| H02P 1/02 | (2006.01) |
| F04D 25/06 | (2006.01) |
| F04D 27/00 | (2006.01) |
| F04C 29/00 | (2006.01) |
| F04C 23/00 | (2006.01) |

(Continued)

(52) U.S. Cl.
CPC .............. *F04C 28/28* (2013.01); *F04B 49/06* (2013.01); *F04B 49/20* (2013.01); *F04B 51/00* (2013.01); *F04C 18/0215* (2013.01); *F04C 23/008* (2013.01); *F04C 29/0085* (2013.01); *F04D 25/06* (2013.01); *F04D 27/00* (2013.01); *F25B 49/022* (2013.01); *F25B 49/025* (2013.01); *H02P 1/029* (2013.01); *F04B 2203/0201* (2013.01); *F04C 2270/72* (2013.01); *F04C 2270/86* (2013.01); *F25B 2700/151* (2013.01)

(58) Field of Classification Search
CPC .................. F04C 28/06; F04C 2270/86; F04C 2270/72; F04C 29/0085; F04C 2270/80; F04C 23/008; F04C 28/28; F04C 18/0215; F25B 49/022; F25B 2700/151; F25B 49/025; F04B 49/06; F04B 51/00; F04B 2203/0201; F04B 49/20; F04D 25/06; F04D 27/00; H02P 1/029; G01R 19/16571; H02H 7/097
See application file for complete search history.

(56) References Cited

U.S. PATENT DOCUMENTS

| | | | | |
|---|---|---|---|---|
| 10,295,239 B2 * | 5/2019 | West | ................ | F25B 31/02 |
| 11,162,702 B2 * | 11/2021 | Blair | ................ | F24F 11/62 |

(Continued)

FOREIGN PATENT DOCUMENTS

| | | |
|---|---|---|
| CN | 104279150 A | 1/2015 |
| CN | 105091186 A | 11/2015 |

(Continued)

*Primary Examiner* — Peter J Bertheaud
(74) *Attorney, Agent, or Firm* — BRYAN CAVE LEIGHTON PAISNER LLP

(57) ABSTRACT

A compressor fault diagnostic apparatus including a current sensing unit to sense a current flowing through a motor of the compressor, a fault diagnostic unit to determine whether or not the motor performs a reverse rotation based on the current flowing through the motor, and a cut-off unit to remove power based on a determination of the fault diagnostic unit.

17 Claims, 8 Drawing Sheets

(51) Int. Cl.
    *F04B 49/20*          (2006.01)
    *F04C 18/02*          (2006.01)
    *F04B 49/06*          (2006.01)
    *F04B 51/00*          (2006.01)

(56) References Cited

U.S. PATENT DOCUMENTS

2015/0377536 A1* 12/2015 West .................... F25B 49/022
                                                                    62/126
2017/0314797 A1* 11/2017 Blair ...................... F24F 11/52

FOREIGN PATENT DOCUMENTS

| | | | |
|---|---|---|---|
| CN | 105334475 | A | 2/2016 |
| CN | 105743065 | A | 7/2016 |
| JP | 2002-317791 | A | 10/2002 |
| JP | 2007212023 | A | 8/2007 |
| JP | 2007259641 | A | 10/2007 |
| JP | 2007-300775 | A | 11/2007 |
| JP | 2013083361 | A | 5/2013 |
| KR | 1020040059357 | A | 7/2004 |
| KR | 20100083257 | A | 7/2010 |

* cited by examiner

COMPRESSOR FAULT DIAGNOSTIC APPARATUS AND SYSTEM

CROSS-REFERENCE TO RELATED APPLICATIONS

This application claims the priority benefit of Korean Application No. 10-2019-0004130, filed on Jan. 11, 2019, the contents of which is hereby incorporated by reference for all purposes as if fully set forth herein.

BACKGROUND

1. Field

The present disclosure relates to a diagnostic apparatus of a motor drive circuit capable of detecting whether or not a switching device included in the motor drive circuit is faulty, and a diagnostic method thereof.

2. Description of the Related Art

Generally, a compressor is an apparatus for converting mechanical energy into compressive energy of a compressible fluid, which is then used as a part of a refrigerating appliance, for example, a refrigerator or an air conditioner.

Compressors are largely divided into reciprocating compressors, rotary compressors, and scroll compressors. In the reciprocating compressor, a compression space in which working gas is sucked or discharged is formed to compress refrigerant between a piston and a cylinder while the piston linearly reciprocates in the cylinder. In the rotary compressor, a compression space in which working gas is sucked or discharged is formed between a roller and a cylinder being eccentrically rotated to compress refrigerant while the roller eccentrically rotates along an inner wall of the cylinder. In the scroll type compressor, a compression space in which working gas is sucked or discharged is formed between an orbiting scroll and a fixed scroll to compress refrigerant while the orbiting scroll is rotated along the fixed scroll.

However, when a constant-speed compressor is driven at a fixed frequency (e.g., an input power frequency), a problem may occur such that the compressor performs a reverse rotation as an outage occurs at an input power source.

Specifically, when input power applied to the constant-speed compressor is instantaneously removed (e.g., power line fault), a phase sequence of the input power may be changed, and thus a compressor motor may rotate in a direction opposite to its designed rotational direction. When the compressor motor performs a reverse rotation, a pressure forming process in the compressor is abnormally carried out, thereby reducing the reliability of a mechanism unit constituting the compressor.

Korean Patent Publication No. 10-2010-0083257 (published on Jul. 22, 2010), discloses a compressor reverse rotation preventing device for preventing damage to a compressor by sensing a pressure change on a suction side and a discharge side of a screw compressor or a scroll compressor as a technology for preventing a reverse rotation of the compressor.

However, Korean Patent Publication No. 10-2010-0083257 merely discloses a method for solving a problem that an orbiting scroll may be reversed when a torque of a rotary shaft is formed to be smaller compared to a compressed gas pressure, but does not provide a solution for the problem of reverse rotation in the compressor motor due to an instantaneous power outage.

Considering that constant-speed compressors are mainly used in facilities such as refrigeration warehouses, sensing a fault that can be caused by a power outage, and responding to the fault is a major factor in compressor performance.

Accordingly, there is a need for a compressor fault diagnostic apparatus capable of sensing a reverse rotation due to an instantaneous power outage to prevent compressor damage.

SUMMARY

One object of the present disclosure is to provide a compressor fault diagnostic apparatus capable of determining whether or not a compressor performs reverse rotation.

Specifically, one embodiment of the present disclosure provides a method and apparatus capable of monitoring whether or not a compressor performs a reverse rotation due to an instantaneous power outage, and controlling the operation of the compressor so as to prevent a fault of the compressor when the compressor performs a reverse rotation.

In order to solve the foregoing problem, a compressor fault diagnostic apparatus according to an embodiment of the present disclosure may include a current sensing unit to sense a current flowing through a motor within the compressor, a fault diagnostic unit to determine whether or not the motor performs a reverse rotation based on the current flowing through the motor, and a cut-off unit to remove power based on a determination of the fault diagnostic unit.

According to a compressor fault diagnostic apparatus of the present disclosure, the operation of a compressor may be controlled to prevent the compressor motor from performing a reverse rotation even when an instantaneous power outage occurs on an input power side, thereby improving the operation reliability of the compressor.

Furthermore, the compressor fault diagnostic apparatus according to the present disclosure may determine whether or not the compressor performs a reverse rotation without interrupting the operation of a compressor every time an instantaneous power outage occurs, thereby preventing the operation efficiency of the compressor and a facility having the same from being deteriorated.

Additionally, the compressor fault diagnostic apparatus according to the present disclosure may have an advantage capable of determining whether the compressor is in a reverse rotation state or a refrigerant leakage state by using a plurality of parameters, and further determining whether or not a condenser provided in a compressor motor is faulty.

Moreover, the compressor fault diagnostic apparatus according to the present disclosure may determine the cause of a fault of the compressor as described above to promptly transmit it to a user through an external communication network, facilitating quick coping of the compressor fault.

Another embodiment of the present disclosure provides a system for determining compressor fault status, comprising an outdoor unit including a controller to control the operation of the outdoor unit, a compressor to compress refrigerant; and a condenser to remove excess heat from the refrigerant. The system also includes an indoor unit including a controller, in communication with the outdoor unit, to monitor temperature and control the operation of the outdoor unit; and an evaporator to cool environmental air passing there across, the refrigerant having been lowered in pressure prior to the evaporator; and power, control, and refrigerant connections between the indoor and outdoor units, wherein the compressor includes a compressor fault diagnostic unit, comprising a current sensing unit to sense a current flowing through a motor within the compressor; a fault diagnostic unit to determine whether or not the motor performs a reverse rotation based on the current flowing through the motor; and a cut-off unit to remove power from the motor based on a determination of the fault diagnostic unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
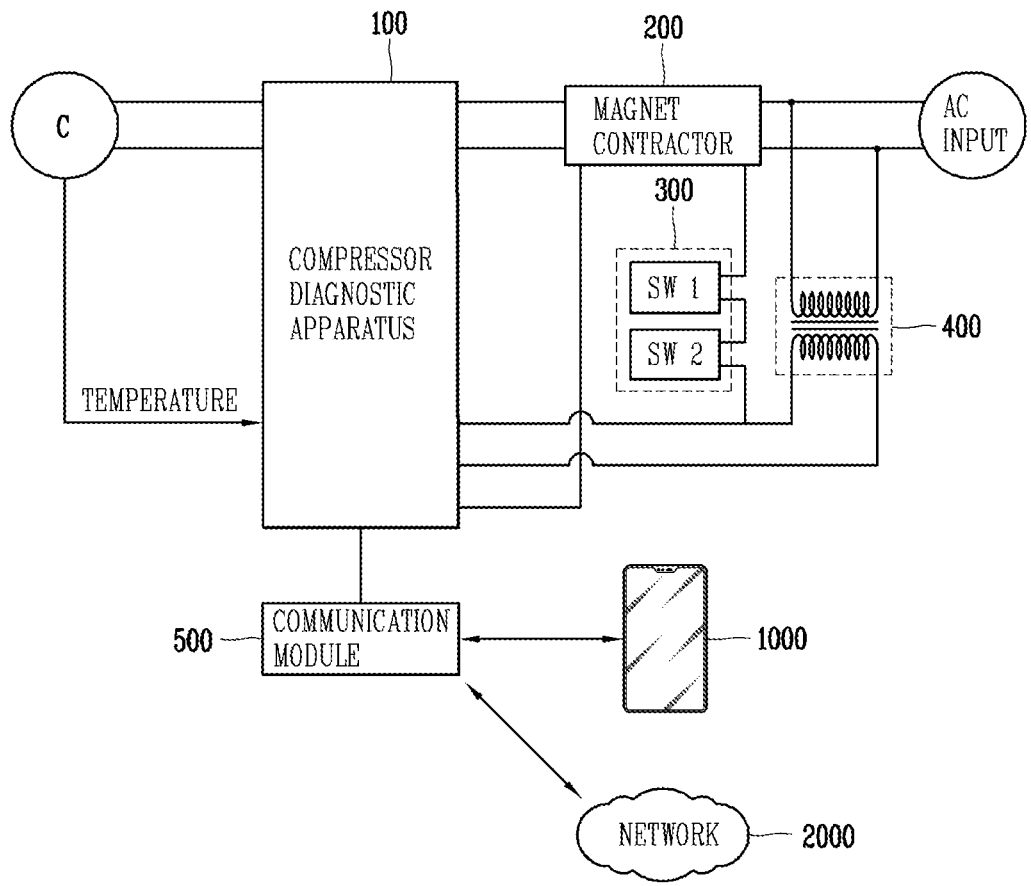
FIG. 1 is a conceptual view showing a compressor fault diagnostic apparatus according to one embodiment of the present disclosure.

Hereinafter, the embodiments disclosed will be described in detail with reference to the accompanying drawings, and the same or similar elements are designated with the same numeral references regardless of the numerals in the drawings and their redundant description will be omitted. It should be understood that the accompanying drawings are merely illustrated to explain the concept of the invention, and therefore, they should not be construed to limit the technological concept disclosed herein, and the concept of the present disclosure should be construed as being extended to all modifications, equivalents, and substitutes included in the concept and technological scope of the invention.

FIG. 1 is a conceptual view showing a compressor fault diagnostic apparatus 100 according to the present disclosure.

The compressor fault diagnostic apparatus 100 may be connected to a compressor (C), an input power source (AC input), and a cut-off unit 200, and may collect information for diagnosing whether or not the compressor is faulty.

For example, compressor fault diagnostic apparatus 100 may sense a temperature of refrigerant circulating in the compressor and monitor a current flowing through the compressor motor.

Additionally, cut-off unit 200 performs the role of cutting off ("removing") external power applied to the compressor. Compressor fault diagnostic apparatus 100 may variably set a time at which power is cut off by controlling the cut-off unit 200.

Furthermore, compressor fault diagnostic apparatus 100 may perform communication with a terminal 1000 or an external network 2000 remotely located from the compressor using a communication module 500.

For an example, compressor fault diagnostic apparatus 100 may diagnose whether or not the compressor is faulty, and use the communication module to transmit information including the diagnosis result to a user's terminal.

Figure 2:
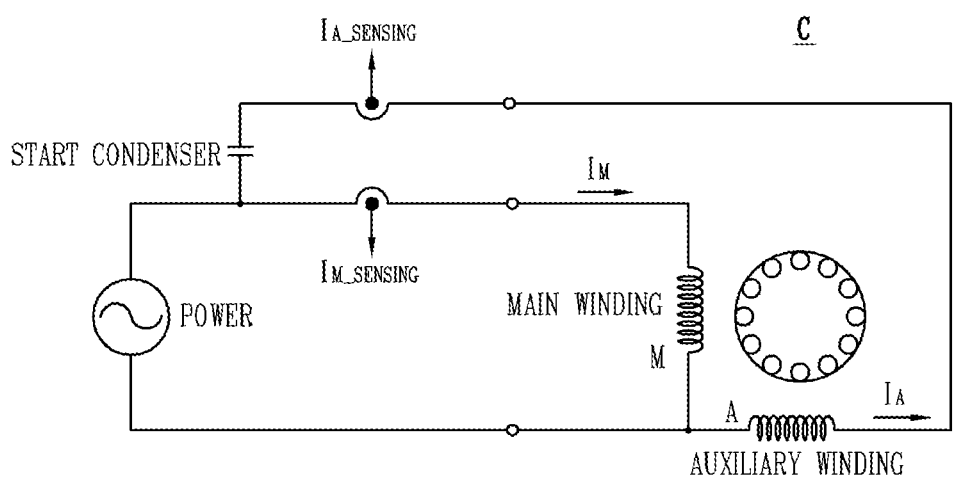
FIG. 2 is a circuit diagram showing a motor circuit of a compressor to be diagnosed.

FIG. 2 is a circuit diagram showing a motor circuit of a compressor to be diagnosed.

As illustrated in FIG. 2, the motor of the compressor includes a main winding and an auxiliary winding.

In particular, the auxiliary winding is connected in series with a condenser having a predetermined capacity, thereby forming a difference between the phase of a first current (Im) flowing through the main winding and the phase of a second current (Ia) flowing through the auxiliary winding.

In one embodiment, when the motor is normally driven in a designed direction, the phase of the second current (Ia) may be formed ahead of the phase of the first current (Im). At this time, a phase difference between the first current and the second current may be formed at 90°.

Hereinafter, the main winding in FIG. 2 is defined as a "first winding" and the auxiliary winding is defined as a "second winding." Moreover, a current flowing through the first winding is defined as a first current (Im), and a current flowing in the second winding is defined as a second current (Ia).

Figure 3:
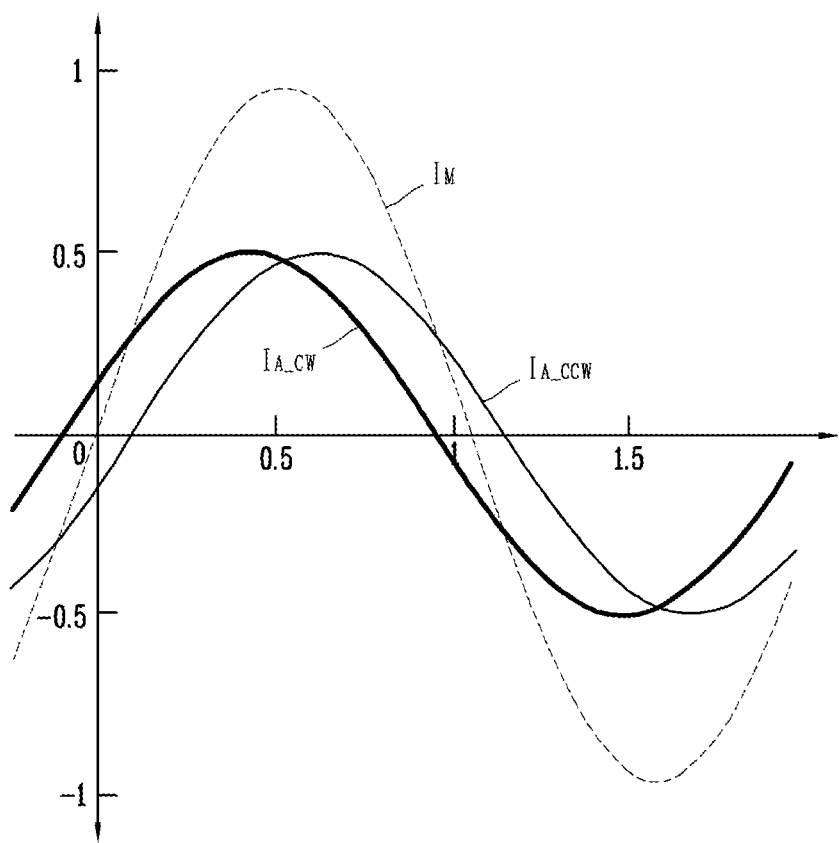
FIG. 3 is a graph in which a current flowing through a main winding of a motor is compared with a current flowing through an auxiliary winding thereof.

FIG. 3 is a graph in which a first current flowing through a main winding of a motor is compared with a second current flowing through an auxiliary winding thereof.

When the compressor is normally driven, the second current (Ia_cw) has a phase ahead of the first current (Im).

Conversely, when the compressor motor performs a reverse rotation, the second current (Ia_ccw) has a phase later than the first current (Im).

Figure 4:
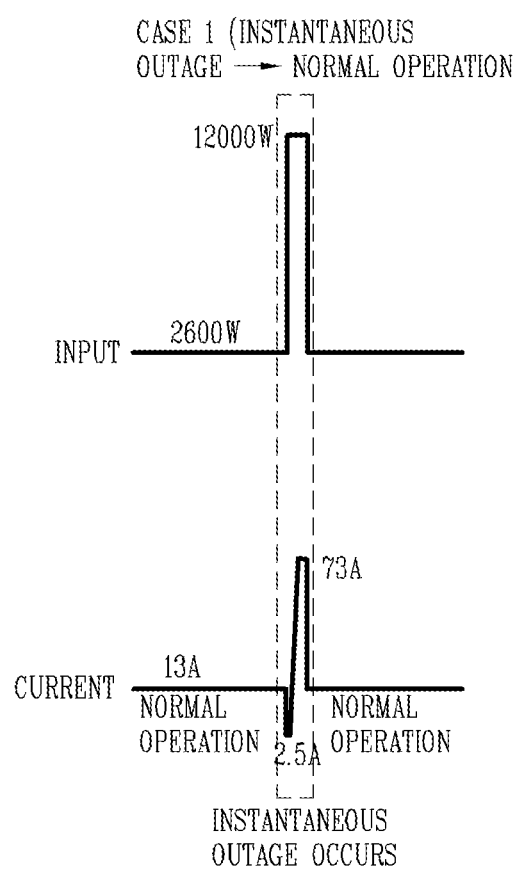
FIG. 4 is a graph showing an example in which a compressor is normally driven after an instantaneous power outage occurs.
Figure 5:
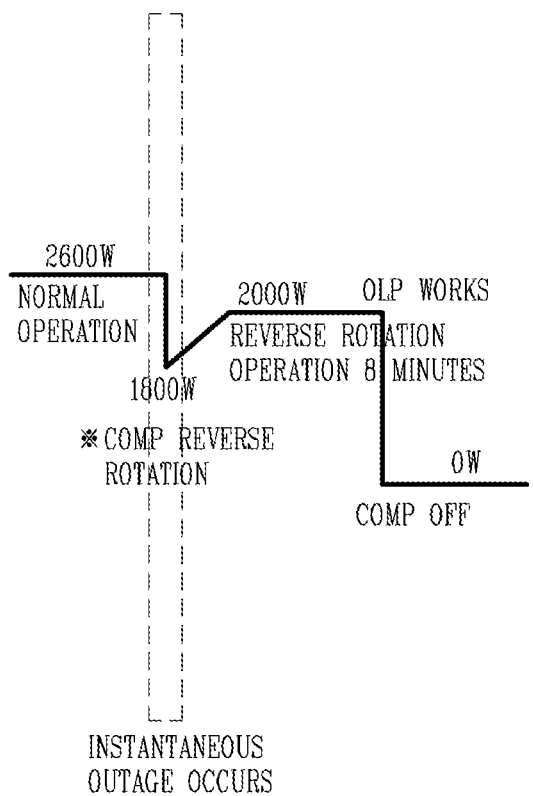
FIG. 5 is a graph showing an example in which a compressor is abnormally driven after an instantaneous power outage occurs.
Figure 6:
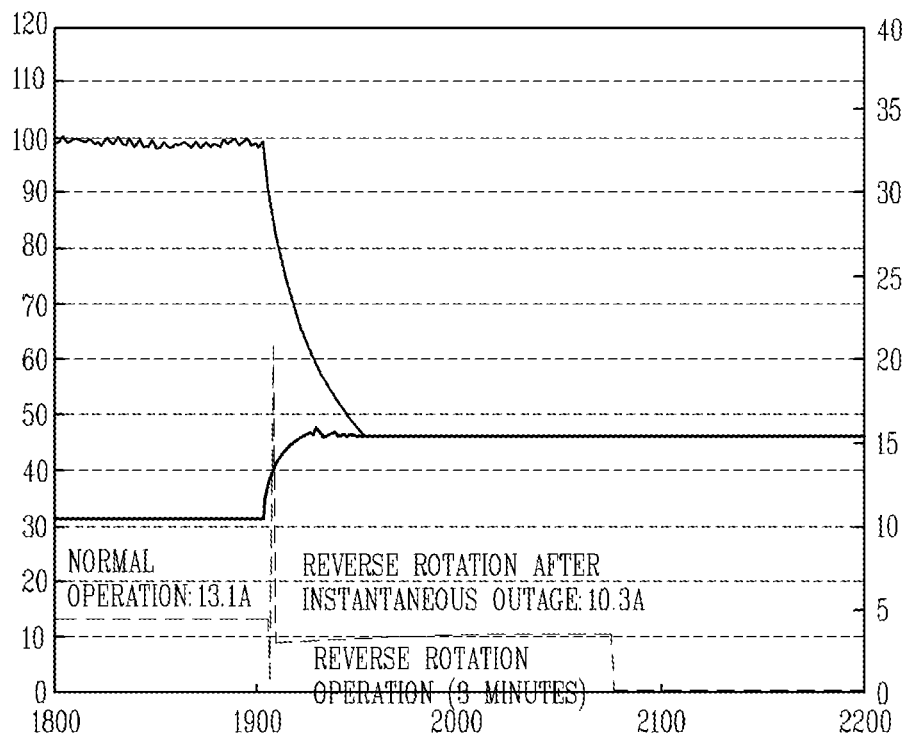
FIG. 6 is a graph showing another example in which a compressor is abnormally driven after an instantaneous power outage occurs.

FIG. 4 is a graph showing an example in which the compressor is normally driven after an instantaneous power failure occurs, and FIGS. 5 and 6 are graphs showing an example in which the compressor is abnormally driven after an instantaneous power outage occurs.

Referring to FIGS. 5 and 6, it is illustrated that the compressor performs a reverse rotation for a considerable period of time subsequent to the occurrence of a power outage. When the compressor performs a reverse rotation due to a power outage as described above, there is a problem that the mechanical reliability of the compressor is deteriorated.

Figure 7:
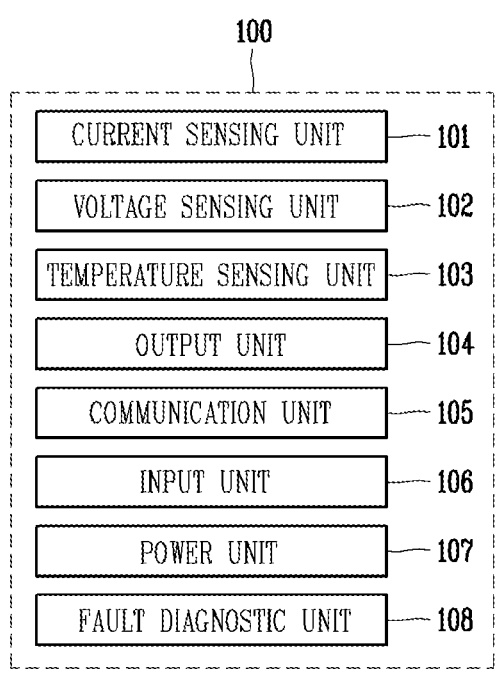
FIG. 7 is a block diagram showing specific components of a compressor fault diagnostic apparatus according to the present disclosure.

FIG. 7 is a block diagram showing specific components of a compressor fault diagnostic apparatus according to the present disclosure.

Referring to FIG. 7, compressor fault diagnostic apparatus 100 includes a current sensing unit 101, a voltage sensing unit 102, a temperature sensing unit 103, an output unit 104, a communication unit 105, an input unit 106, a power unit 107, and a fault diagnostic unit 108.

Furthermore, although not illustrated in FIG. 7, compressor fault diagnostic apparatus 100 may further include a cut-off unit 500 shown in FIG. 1.

Current sensing unit 101 may sense a current flowing through a motor constituting the compressor. For example, current sensing unit 101 may sense a plurality of currents flowing at a plurality of points of the motor constituting the compressor, respectively.

Similarly, voltage sensing unit 102 may sense a voltage applied to the compressor. Temperature sensing unit 103 may sense a compressor discharge portion temperature, a compressor inlet portion temperature, a cylinder temperature, and the like.

Output unit 104 may output information related to a failure diagnostic result. For example, output unit 104 may include a plurality of LEDs. In another example, output unit 104 may be configured with a display capable of displaying an image.

Communication unit 105 may transmit information related to a fault diagnostic result to a terminal or an external server. Furthermore, communication unit 105 may also receive an operation signal set by the terminal.

Input unit 106 may receive a user input for controlling compressor fault diagnostic apparatus 100. For example, input unit 106 may receive a user input for setting the operation mode of the compressor fault diagnostic apparatus when it is determined that the fault is diagnosed or a cycle for performing the fault diagnosis.

The fault diagnostic unit 108 may determine whether or not the motor of the compressor performs a reverse rotation using the current sensing unit.

In one embodiment, when a current value sensed by the current sensing unit is less than or equal to a preset reference current value, the fault diagnostic unit 108 may determine that the motor performs a reverse rotation, and control the cut-off unit to cut off power.

At this time, the reference current value may be set to a value within a range of 70% to 80% of a rated current value. Compressor fault diagnostic apparatus 100 may receive a user input for increasing the reference current value to improve a reverse rotation prevention probability. Conversely, compressor fault diagnostic apparatus 100 may receive a user input for decreasing a reference current value to increase a driving efficiency of the compressor.

On the other hand, current sensing unit 101 may sense a first current flowing through the first winding constituting the motor of the compressor and a second current flowing through the second winding constituting the motor, respectively.

The fault diagnostic unit 108 may control the cut-off unit to restart the motor when the value of the first current is less than or equal to the reference current value. In other words, when the value of the first current is less than or equal to the reference current value, the fault diagnostic unit 108 may determine that the motor performs a reverse rotation and cut off power applied to the compressor for a predetermined period of time to prevent the reverse rotation.

Figure 9:
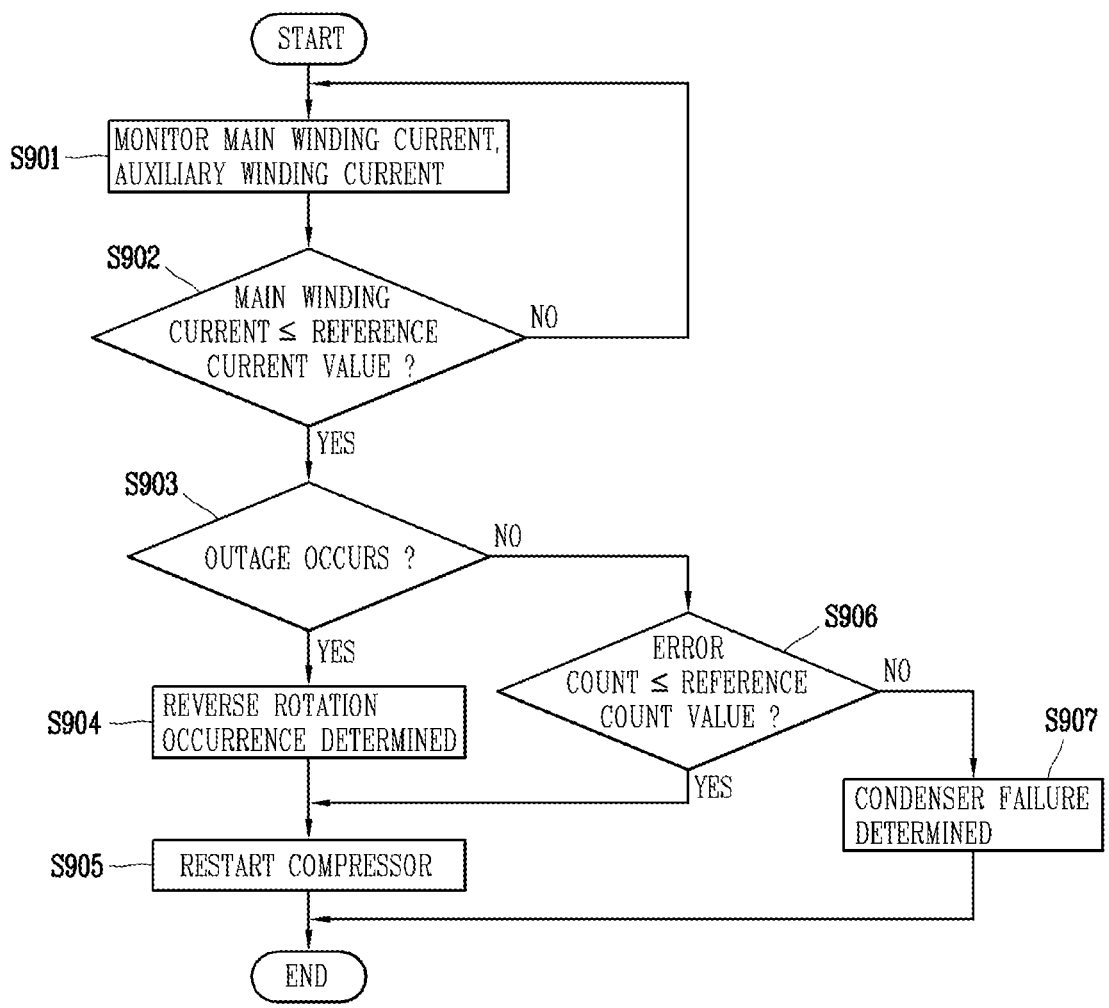
FIG. 9 is a flowchart showing another control method of a compressor fault diagnostic apparatus according to the present disclosure.

It may be possible to determine whether or not the compressor performs a reverse rotation in consideration of only the magnitude of a current flowing through the main winding of the motor as described above. Referring to FIG. 9, there is illustrated a method of monitoring the magnitude of a main winding current, that is, a first current, to determine whether or not the compressor performs a reverse rotation.

As illustrated in FIG. 9, current sensing unit 101 may sense a first current flowing through the first winding constituting the motor of the compressor and a second current flowing through the second winding constituting the motor, respectively (S901).

The fault diagnostic unit 108 may determine whether or not the first current is less than or equal to the reference current value (S902). When the first current drops below the reference current value, the fault diagnostic unit 108 may determine whether or not an outage has occurred on a power side (S903).

Through the determination processes (S902, S903), the fault diagnostic unit 108 may determine whether or not the compressor motor performs a reverse rotation (S904).

Meanwhile, compressor fault diagnostic apparatus according to the present disclosure may determine whether or not a reverse rotation has occurred by comparing the phases of the first current and the second current with each other together with the magnitude of a current sensed by the current sensing unit.

Specifically, the fault diagnostic unit 108 may compare the phases of the first current and the second current with each other when the first current is less than or equal to the reference current value, and determine whether or not the motor performs a reverse rotation based on the phase comparison result.

Specifically, when it is determined that a value of the first current is lower than or equal to the reference current value, and the phase of the first current is ahead of the phase of the second current, the fault diagnostic unit 108 determines that the motor performs a reverse rotation.

When it is determined that a value of the first current is lower than or equal to the reference current value, and the phase of the second current is ahead of the phase of the first current, the fault diagnostic unit 108 determines that refrigerant circulating in the compressor is leaked.

When it is determined that a value of the first current is lower than or equal to the reference current value, and the phase of the first current is ahead of the phase of the second current, the fault diagnostic unit 108 determines whether or not an outage has occurred on power. In addition, when it is determined that an outage has occurred on power, the fault diagnostic unit 108 may determine that the motor performs a reverse rotation.

In determining whether or not a power outage has occurred, the fault diagnostic unit 108 may use a voltage sensing unit that senses the magnitude of a voltage of input power.

When it is determined that a power outage has not occurred after it is determined that a value of the first current is lower than or equal to the reference current value, and the phase of the first current is ahead of the phase of the second current, the fault diagnostic unit 108 may increase a predetermined count variable by one unit.

The count variable may be initialized to zero every time the cut-off unit operates, and may be incremented by one by the fault diagnostic unit 108.

When the incremented count variable is less than or equal to a preset reference count value, the fault diagnostic unit 108 may cut off power supplied to the compressor.

The fault diagnostic unit 108 may determine that a condenser included in the motor is abnormal when the incremented count variable is less than the preset reference count value.

As described above, fault diagnostic unit 108 may determine whether or not refrigerant is leaked, whether or not a reverse rotation is carried out, and whether or not a condenser is faulty, and transfer the respective determination results in a distinguishable manner to the user.

Figure 8:
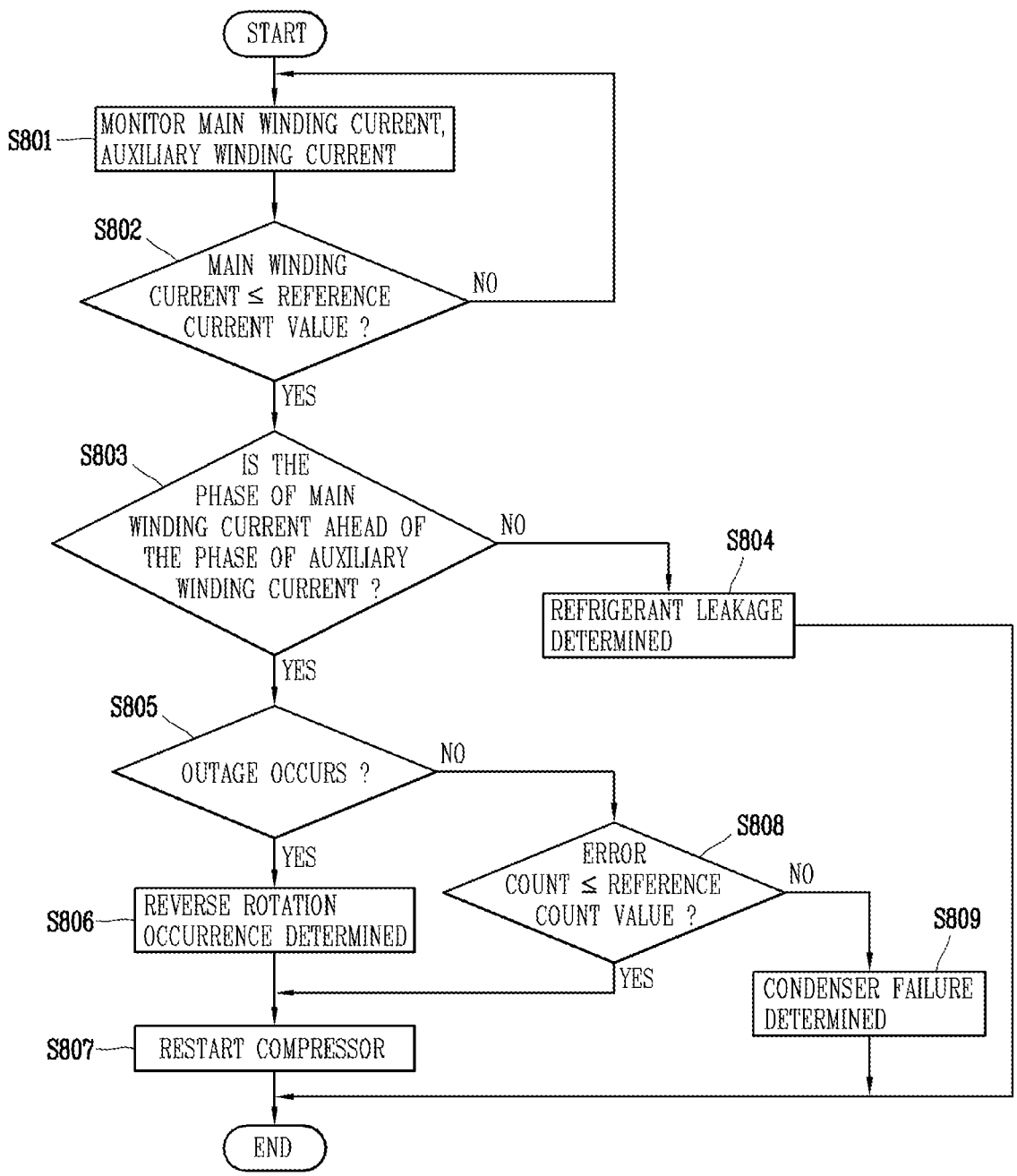
FIG. 8 is a flowchart showing a control method of a compressor fault diagnostic apparatus according to the present disclosure.

Referring to FIG. 8, there is illustrated a method of determining whether or not the compressor performs a reverse rotation using a magnitude of the first current and a phase comparison between the first and second currents.

Referring to FIG. 8, current sensing unit 101 may sense a first current flowing through the first winding constituting the motor of the compressor and a second current flowing through the second winding constituting the motor, respectively (S801). Fault diagnostic unit 108 may determine whether or not the first current is less than or equal to the reference current value (S802).

When the first current droops below the reference current value, the fault diagnostic unit 108 may compare the phase of the first current with the phase of the second current (S803).

Specifically, fault diagnostic unit 108 may determine whether or not the phase of the first current is ahead of the phase of the second current.

When it is determined in the phase comparison process (S803) that the phase of the first current is ahead of the phase of the second current, the fault diagnostic unit 108 may determine whether or not an outage has occurred on a power side (S805). On the other hand, when it is determined in the phase comparison process (S803) that the phase of the first current is not ahead of the phase of the second current, the fault diagnostic unit 108 may determine that refrigerant is leaked (S804).

Determining whether a power outage has occurred (S805) may be accomplished in several ways which are not detailed herein. Only the resultant determination of whether or not a power outage has occurred in combination with information regarding the current value of the main winding and the current phase relationship of the main and auxiliary windings is needed.

Moreover, when it is determined that the phase of the first current is ahead of the phase of the second current and a power outage has occurred, the fault diagnostic unit 108 may determine that a reverse rotation has occurred (S806). In response to this, the fault diagnostic unit 108 may cut off power for a predetermined period of time to restart the compressor (S807).

On the contrary, when it is determined that the phase of the first current is ahead of the phase of the second current and that a power outage has not occurred, the fault diagnostic unit 108 may increase a predetermined count variable by one unit, and determine whether or not the increased count variable is less than or equal to a reference count value (S808).

When the increased count variable is less than or equal to the reference count value, fault diagnostic unit 108 may cut off input power for a predetermined period of time to restart the compressor (S807). On the other hand, when the increased count variable exceeds the reference count value, fault diagnostic unit 108 may determine that a condenser provided in the motor of the compressor is faulty (S809).

According to a compressor fault diagnostic apparatus of the present disclosure, the operation of a compressor may be controlled not to allow a compressor motor to perform a reverse rotation even when an instantaneous outage occurs on an input power side, thereby obtaining an effect of improving the operation reliability of the compressor.

Furthermore, the compressor fault diagnostic apparatus according to the present disclosure may determine whether or not the compressor performs a reverse rotation without interrupting the operation of a compressor every time an instantaneous power outage occurs, thereby preventing the operation efficiency of the compressor and a facility having the same from being deteriorated.

Additionally, the compressor fault diagnostic apparatus according to the present disclosure may have an advantage capable of determining whether the compressor is in a reverse rotation state or a refrigerant leakage state by using a plurality of parameters, and further determining whether or not a condenser provided in a compressor motor is faulty.

Moreover, the compressor fault diagnostic apparatus according to the present disclosure may determine the cause of a fault of the compressor as described above and promptly transmit it to a user through an external communication network, thereby obtaining an effect of quickly coping with the fault of the compressor.

Figure 10:
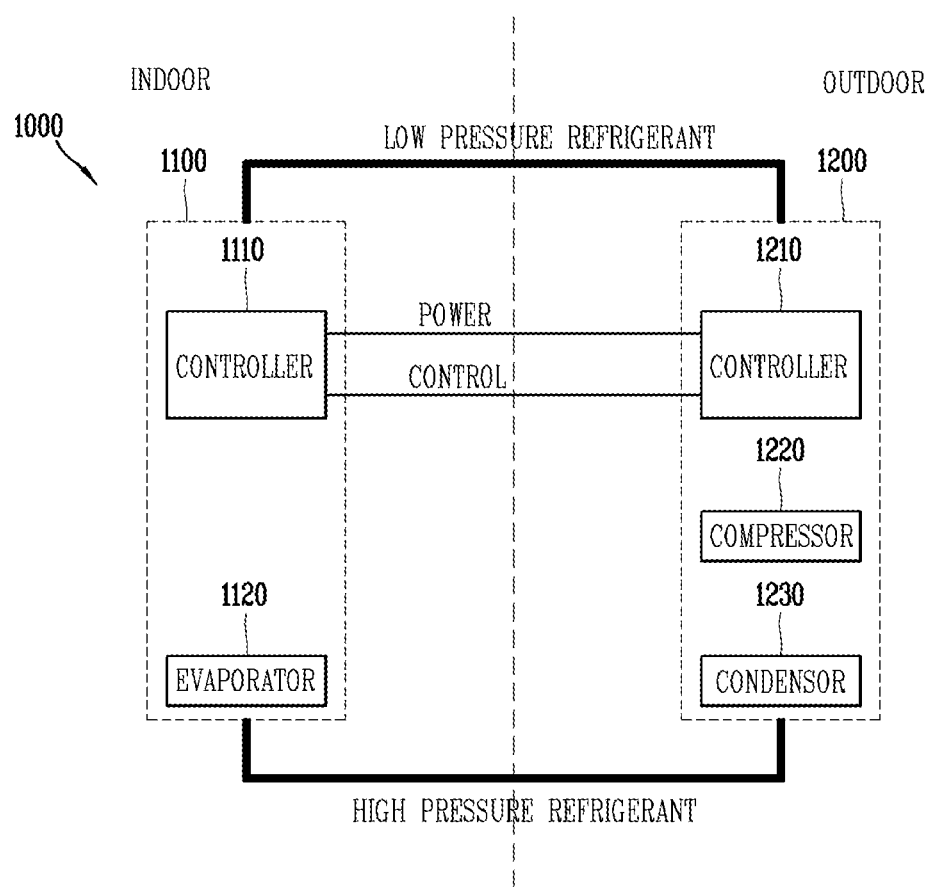
FIG. 10 is an exemplary system utilizing the compressor fault diagnostic apparatus.

FIG. 10 is an exemplary system utilizing the compressor fault diagnostic apparatus. The system 1000 includes inside and outside components. In one embodiment, inside and outside in the system refers to indoor and outdoor, but the invention is not so limiting, and could, for example, refer to the interior and exterior of a refrigerator or the like. However, regardless of the context of the system 1000, the inside (or indoor) unit 1100 of the system includes at least a controller 1110 and an evaporator 1120. The outside (or outdoor) unit 1200 of the system includes at least a controller 1210, a compressor 1220, and a condenser 1230.

The indoor unit 1110 and outdoor unit 1200 are connected by power and control paths as well as low pressure and high pressure refrigerant paths. The indoor controller 1110 includes one or more sensors to determine environmental condition(s) and based on a comparison of a user's input condition determine the amount of temperature differentiation needed, and the speed of the air flow. The indoor controller 110 then communicates with the outdoor controller 1210 to activate the compressor 1220. The compressor 1120 compresses refrigerant to a higher pressure which also causes the refrigerant to heat up. Accordingly, the high pressure refrigerant is passed through a condenser coil 1230 where air is blown across the coil to remove the excess heat. The high pressure refrigerant is then sent towards the indoor unit 1100. Prior to the evaporator 1120 the high pressure refrigerant passes through an expansion valve (not shown) which changes the refrigerant to low pressure which lowers the temperature of the refrigerant.

This lower temperature refrigerant is then passed through an evaporator coil 1120 where air is then blown across the evaporator coil 1120 cooling the air. The low pressure refrigerant is then sent towards the outdoor unit 1200 and the compressor 1220 completing a loop for the refrigerant. This process continues until the indoor controller 1110 indicates that the environmental conditions (e.g., temperature) of the indoor environment matches the user's input. When the indoor environment matches the user's input, the indoor controller 1110 communicates to the outdoor controller 1210 to stop the compressor and the flow of refrigerant in the refrigerant cycle.

The exemplary system of FIG. 10 may include a compressor fault diagnostic apparatus as disclosed above to determine certain fault conditions of the compressor (e.g., reverse rotation).

It should be noted that effects of the present invention are not limited to the effects of the present invention as mentioned above, and other unmentioned effects of the present invention will be clearly understood by those skilled in the art from the following claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings, and the appended claims. In addition to variations and modifications in the component parts and/or arrangements, alternative uses will also be apparent to those skilled in the art.

What is claimed is:

1. A compressor fault diagnostic apparatus, comprising:
a current sensing unit to sense a current flowing through a motor within the compressor;
a fault diagnostic unit to determine whether or not the motor performs a reverse rotation based on the current flowing through the motor; and
a cut-off unit to remove power from the motor based on a determination of the fault diagnostic unit,
wherein the current sensing unit senses a first current flowing through a first winding of the motor of the compressor and a second current flowing through a second winding of the motor, respectively, and
wherein the fault diagnostic unit compares a value of the first current and a preset reference current value, and determines whether the motor has performed the reverse rotation according to a result of comparing the value of the first current and the reference current value.

2. The apparatus of claim 1, wherein when the value of the first current is less than or equal to the preset reference current value, the fault diagnostic unit determines that the motor has performed a reverse rotation, and controls the cut-off unit to remove the power from the motor.

3. The apparatus of claim 2, wherein when the value of the first current is less than or equal to the reference current value, the fault diagnostic unit controls the cut-off unit to restart the motor.

4. The apparatus of claim 3, wherein when the first current is less than or equal to the reference current value, the fault diagnostic unit compares phases of the first current and the second current with each other, and determines whether or not the motor performs a reverse rotation based on the phase comparison result.

5. The apparatus of claim 4, wherein when it is determined that a value of the first current is lower than or equal to the reference current value, and the phase of the first current is ahead of the phase of the second current, the fault diagnostic unit determines that the motor performs a reverse rotation.

6. The apparatus of claim 5, wherein when it is determined that a value of the first current is lower than or equal to the reference current value, and the phase of the second current is ahead of the phase of the first current, the fault diagnostic unit determines that refrigerant circulating in the compressor is leaked.

7. The apparatus of claim 5, wherein when it is determined that a value of the first current is lower than or equal to the reference current value and the phase of the first current is ahead of the phase of the second current, the fault diagnostic unit determines whether or not a power outage has occurred, and determines that the motor has performed a reverse rotation when it is determined that a power outage has occurred on the power.

8. The apparatus of claim 7, further comprising:
a voltage sensing unit to sense a voltage applied to the compressor,
wherein the fault diagnostic unit determines whether or not a power outage has occurred using the voltage sensing unit.

9. The apparatus of claim 7, wherein after it is determined that a value of the first current is lower than or equal to the reference current value and the phase of the first current is ahead of the phase of the second current, the fault diagnostic unit increments a predetermined count variable by one unit when it is determined that a power outage has not occurred.

10. The apparatus of claim 9, wherein the fault diagnostic unit controls the cut-off unit to restart the compressor when the incremented count variable is less than or equal to a preset reference count value.

11. The apparatus of claim 10, wherein the fault diagnostic unit determines that a condenser included in the motor is abnormal when the incremented count variable is greater than a preset reference count value.

12. The apparatus of claim 3, wherein the second winding is connected in series with a condenser having a predetermined capacity, and the first winding is connected in parallel with the second winding and the condenser.

13. The apparatus of claim 12, wherein the current sensing unit senses the first current at a point between the first winding and the power, and senses the second current at a point between the second winding and the condenser.

14. The apparatus of claim 1, further comprising:
a communication unit to transmit information related to the operation of the fault diagnostic apparatus to an external server or receive a predetermined signal from the external server,
wherein the fault diagnostic unit controls the communication unit to transmit information related to the reverse rotation of the motor to a user terminal when it is determined that the motor performs a reverse rotation.

15. The apparatus of claim 1, wherein when the first current is less than or equal to the reference current value, the fault diagnostic unit compares phases of the first current and the second current with each other.

16. The apparatus of claim 15, wherein when it is determined that a value of the first current is lower than or equal to the reference current value, and the phase of the second current is ahead of the phase of the first current, the fault diagnostic unit determines that refrigerant circulating in the compressor is leaked.

17. The apparatus of claim 15, wherein when it is determined that a value of the first current is lower than or equal to the reference current value and the phase of the first current is ahead of the phase of the second current, the fault diagnostic unit determines whether or not a power outage has occurred, and determines that the motor has performed a reverse rotation when it is determined that a power outage has occurred on the power.

* * * * *